(12) United States Patent
Li et al.

(10) Patent No.: US 10,839,238 B2
(45) Date of Patent: Nov. 17, 2020

(54) REMOTE USER IDENTITY VALIDATION WITH THRESHOLD-BASED MATCHING

(71) Applicant: International Business Machines Corporation, Armonk, NY (US)

(72) Inventors: Ying Li, Mohegan Lake, NY (US); Harummiati Gandasasmita, Epping (AU); Chitra Dorai, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 15/934,514

(22) Filed: Mar. 23, 2018

(65) Prior Publication Data
US 2019/0294900 A1    Sep. 26, 2019

(51) Int. Cl.
*G06F 21/40* (2013.01)
*G06K 9/00* (2006.01)

(52) U.S. Cl.
CPC ......... *G06K 9/00892* (2013.01); *G06F 21/40* (2013.01); *G06K 9/00161* (2013.01); *G06K 9/00288* (2013.01)

(58) Field of Classification Search
CPC ........... G06Q 20/40145; G06Q 20/341; G06Q 20/40; G06Q 20/401; G06Q 20/4014;
(Continued)

(56) References Cited

U.S. PATENT DOCUMENTS

| 3,582,439 A | * | 6/1971 | Thomas | B32B 27/00 |
| | | | | 235/488 |
| 7,350,707 B2 | * | 4/2008 | Barkan | G06Q 20/042 |
| | | | | 235/454 |

(Continued)

FOREIGN PATENT DOCUMENTS

| CN | 106416189 A | 2/2017 |
| CN | 107408171 A | 11/2017 |

(Continued)

OTHER PUBLICATIONS

Machine Translation of KR 10-2013-0091114 A on Nov. 30, 2019, 9 pages. Retrieved https://iq.ip.com/discover. (Year: 2019).*

(Continued)

*Primary Examiner* — Andrew M Moyer
*Assistant Examiner* — Dennis Rosario
(74) *Attorney, Agent, or Firm* — Richard B. Thomas

(57) ABSTRACT

A method for validating a remote user's identity comprises retrieving a user's photo and a user's signature from a digital associated identification card; requesting a real-time photo set, wherein the real-time photo set includes a first photo and a second photo; requesting a real-time written signature with the requested real-time photo set; signature matching the real-time written signature against the user's signature of the digital associated identification card; background matching a background in the first photo of the real-time photo set against a background in the second photo of the real-time photo set; user matching an image of the user from the first photo against the user's photo from the digital associated identification card; and validating the user's identity in response to determining that the signature matching satisfies a first threshold, the background matching satisfies a second threshold, and the user matching satisfies a third threshold.

24 Claims, 8 Drawing Sheets

(58) Field of Classification Search
CPC ........ G06Q 21/40; G06Q 50/265; G07F 7/12;
G07F 7/127; G07F 7/125; G07F 7/1008;
G07F 7/08; H04N 2201/327; G06K
19/14; G06K 19/10; G06K 9/00288;
G06K 9/00892; G06K 9/00221; G06K
9/00; G06K 9/00154; G07C 9/00079;
G07C 9/00087; G07C 9/00103; G07C
2009/00095; G07C 9/00031; G07C
9/00055; G07C 9/00063; G07C 9/00047;
G07C 9/0015; G07C 9/37; G07C 9/253;
G07C 9/25; G07C 9/35; H04L 9/3231;
H04L 63/0861; G06F 21/32; G06F 21/31;
G06F 2221/2111; B42D 25/23; H04W
12/06; H04W 4/029; H04W 4/02; H04W
12/00503; H04W 4/021; H04W 4/025
See application file for complete search history.

(56) References Cited

U.S. PATENT DOCUMENTS

| | | | |
|---|---|---|---|
| 8,468,090 B2 | 6/2013 | Lesandro et al. | |
| 8,799,088 B2* | 8/2014 | Rothschild | G06Q 20/04 235/380 |
| 9,393,697 B1* | 7/2016 | Beardsley | B25J 11/0005 |
| 9,619,701 B2* | 4/2017 | Ragnet | G06K 9/00463 |
| 9,744,455 B2* | 8/2017 | Yacenda | G07F 17/3225 |
| 10,339,366 B2* | 7/2019 | Mechaley, Jr. | G06K 9/00288 |
| 2003/0191949 A1* | 10/2003 | Odagawa | G06F 21/316 713/186 |
| 2012/0278241 A1* | 11/2012 | Brown | G06F 21/32 705/67 |
| 2013/0212655 A1* | 8/2013 | Hoyos | G06K 9/00107 726/5 |
| 2016/0065558 A1* | 3/2016 | Suresh | H04L 63/08 726/7 |
| 2017/0201518 A1* | 7/2017 | Holmqvist | G06F 21/40 |
| 2017/0262789 A1* | 9/2017 | Zhang | G06Q 10/08 |

FOREIGN PATENT DOCUMENTS

| | | | |
|---|---|---|---|
| KR | 20130091114 A | * | 8/2013 |
| WO | 2009032431 A1 | | 3/2009 |
| WO | 2016128567 A1 | | 8/2016 |
| WO | 2016183380 A1 | | 11/2016 |

OTHER PUBLICATIONS

"Anti-Money Laundering Directives to Bank and Financial Institutions", Nepal Rastra Bank Cetral Office Financial Information Unit (FIU), Nepal, Aug. 17, 2009, (2066, Bhadra-1), 18 pages.

"DBS launches digibank, an entire bank in the phone, in Indonesia", DBS Newsroom, Aug. 29, 2017, Singapore, Indonesia, 3 pages, <https://www.dbs.com/indonesia/newsroom/DBS_launches_digibank_an_entire_bank_in_the_phone_in_Indonesia>.

"Indonesia Demographics Profile 2018", CIA World Factbook, This page was last updated on Jan. 20, 2018, 3 pages, <https://www.indexmundi.com/indonesia/demographics_profile.html>.

"KYCVision | Smart Identity and Address Verification", KYCNET, Last printed on Jan. 31, 2018 2:23 PM EST, 3 pages, <http://kyc.maatwebsite.nl/software/kycvision>.

"Online Application", BCA, Copyright (c) 2013 PT Bank Central Asia Tbk, 1 page, <http://www.klikbca.com/OnlineApplication/online_application_eng.html>.

"Tahapan", Open Account, BCA, Copyright (c) 2013 PT Bank Central Asia Tbk, 2 pages, <http://www.klikbca.com/OnlineApplication/Openaccount/tahapanEng.html>.

Al-Zaqibh, Ahmad Aqeil Mohamad, "International Laws on Money Laundering", International Journal of Social Science and Humanity, vol. 3, No. 1, Jan. 2013, pp. 43-47.

Amir, Muhammad Eunus, "General Banking system of Al-Arafah Islami Bank Ltd.", Internship Report, Atish Dipankar University of Science and Technology (ADUST), May 2015, pp. 26-74.

Anooja, et al., "Role of Reserve Bank of India in Controlling Money Laundering", Sai Om Journal of Commerce & Management, vol. 1, Issue 10 (Oct. 2014), pp. 47-50.

Lee, Justin, "Jumio adds facial recognition, enables Coinbase, releases mobile banking study", BiometricUpdate, Nov. 2, 2016, 4 pages, <http://www.biometricupdate.com/201611/jumio-adds-facial-recognition-enables-coinbase-releases-mobile-banking-study>.

Worley, Will, "HSBC allows customers to use selfies to open new bank accounts", The Independent, Monday Sep. 5, 2016, 3 pages, <http://www.independent.co.uk/life-style/gadgets-and-tech/hsbc-customers-open-bank-accounts-selfies-biometrics-security-a7225916.html>.

International Search Report and Written Opinion dated May 29, 2019, for International Application No. PCT/IB2019/051957, filed Mar. 11, 2019.

* cited by examiner

REMOTE USER IDENTITY VALIDATION WITH THRESHOLD-BASED MATCHING

BACKGROUND

The present disclosure relates to high level architecture, and more specifically, to applying visual analytics to validate a user's identity.

Know-Your-Customer (KYC) implementation is a process of user validation. The KYC process is typically an in-person process and comprises strict regulations for identifying and verifying the identity of clients and consequently, must establish and maintain written customer identification programs setting forth the standards for verifying their identity. Traditionally, strict limitations exist that inhibit a remote user to validate proof of their identity; a critical step of the Know-Your-Customer process. The general state of the art inefficiently prevents fraudulent remote account verification.

SUMMARY

Aspects of the present disclosure are directed to a method for using visual analytics to validate a remote user's identity. The method can comprise retrieving a user's photo and a user's signature from a digital associated identification card while additionally requesting a real-time photo set. The real-time photo set includes a first photo and a second photo. The method can further comprise requesting a real-time written signature with the requested real-time photo set. The method can further comprise signature matching the real-time written signature of the first photo against the user's signature of the digital associated identification card. The method can additionally comprise background matching a background in the first photo of the real-time photo set against a background in the second photo of the real-time photo set. Next, the method can comprise user matching an image of the user from the first photo in the real-time photo set against the user's photo from the digital associated identification card and begin validating the user's identity in response to determining that the real-time written signature of the first photo set matched against the user's signature of the retrieved digital associated identification card satisfies a first threshold, the background in the first photo of the real-time photo set matched against the background in the second photo of the real-time photo set satisfies a second threshold, and the image of the user from the first photo in the real-time photo set matched against the user's photo form the digital associated identification card satisfies a third threshold. In some optional embodiments, the method further comprises rejecting validation of the user's identity in response to determining at least one of: a number of signature matches is less than the first threshold, a number of background matches is less than the second threshold, or a number of user matches is less than the third threshold, where rejecting validation of the user's identity includes initiating an online video session.

Aspects of the present disclosure are directed to a system comprising a computer readable storage medium storing a corpus of data, a user interface configured to receive input and present output and a processor communicatively coupled to the computer readable storage medium and the user interface and having a memory comprising instructions. The instructions can be configured to use visual analytics to validate a remote user's identity. The instructions can further be configured to extract a user's photo and a user's signature from a digital associated identification card and request a real-time photo set. The real-time photo set includes a first photo and a second photo. The instructions can be configured to request a real-time written signature with the requested real-time photo set. The instructions can further be configured to signature match the real-time written signature of the first photo against the user's signature of the digital associated identification card. The instructions can further be configured to background match a background in the first photo of the real-time photo set against a background in the second photo of the real-time photo set. Next, the instructions can be configured to user match an image of the user from the first photo in the real-time photo set against the user's photo from the digital associated identification card and validate the user's identity in response to determining that the real-time written signature of the first photo set matched against the user's signature of the retrieved digital associated identification card satisfies a first threshold, the background in the first photo of the real-time photo set matched against the background in the second photo of the real-time photo set satisfies a second threshold, and the image of the user from the first photo in the real-time photo set matched against the user's photo form the digital associated identification card satisfies a third threshold. In some optional embodiments, the instruction can further be configured to reject validation of the user's identity in response to determining at least one of: a number of signature matches is less than the first threshold, a number of background matches is less than the second threshold, or a number of user matches is less than the third threshold, where rejecting validation of the user's identity includes initiating an online video session.

Aspects of the present disclosure are further directed to a computer program product for using visual analytics to validate a remote user's identity in a mobile application, the computer program product comprising a computer readable storage medium having program instructions embodied therewith, the program instructions executable by a processor. The program instructions can cause the processor to extract a user's photo and a user's signature from a digital associated identification card and request a real-time photo set. The real-time photo set includes a first photo and a second photo. The program instructions can cause the processor to request a real-time written signature with the requested real-time photo set. The program instructions can further cause the processor to signature match the real-time written signature of the first photo against the user's signature of the digital associated identification card. The program instructions can further cause the processor to background match a background in the first photo of the real-time photo set against a background in the second photo of the real-time photo set. Next, the program instructions can cause the processor to user match an image of the user from the first photo in the real-time photo set against the user's photo from the digital associated identification card and validate the user's identity in response to determining that the real-time written signature of the first photo set matched against the user's signature of the retrieved digital associated identification card satisfies a first threshold, the background in the first photo of the real-time photo set matched against the background in the second photo of the real-time photo set satisfies a second threshold, and the image of the user from the first photo in the real-time photo set matched against the user's photo form the digital associated identification card satisfies a third threshold. In some optional embodiments, the program instructions can further cause the processor to reject validation of the user's identity in response to determining at least one of: a number of signature matches is less than the first threshold, a number of background matches is less than the second threshold, or a number of user matches is less than the third threshold.

Aspects of the present disclosure are directed to a method for using visual analytics to validate a remote user's identity. The method can comprise receiving a request to create an account for a user and in response to receiving a request, retrieving a digital copy of an identification card for the user, where the identification card includes a photo of the user and the signature of the user. The method can further comprise providing a prompt to request a first real-time photo of the user with a surrounding user environment. The method can further comprise providing a prompt to request a second real-time photo of the surrounding user environment without the user present. The method can further comprise verifying the current location of the user in response to determining that the surrounding user environment of the first real-time photo matches the surrounding user environment of the second real-time photo and validating the identity of the user based, at least in part, on verification of the current location of the user.

Aspects of the present disclosure are directed to a system for using visual analytics to validate a remote user's identity. The system comprises a user interface configured to receive input and present output and a processor communicatively coupled to the user interface. The processor can be configured to receive, via the user interface, a request to create an account for a user. The processor can further be configured to, in response to receive the request, retrieve a digital copy of an identification card for the user, where the identification card includes a photo of the user and a signature of the user. The processor can further be configured to provide a prompt to request a first real-time photo of the user with a surround user environment. The processor can then be configured to provide a prompt to request a second real-time photo of the surrounding user environment without the user present and further provide a prompt to request a current location of the user. The processor can then be configured to verify the current location of the user in response to determining that the surrounding user environment of the first real-time photo matches the surrounding user environment of the second real-time photo and validate the identity of the user based, at least in part, on verification of the current location of the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Figure 1:
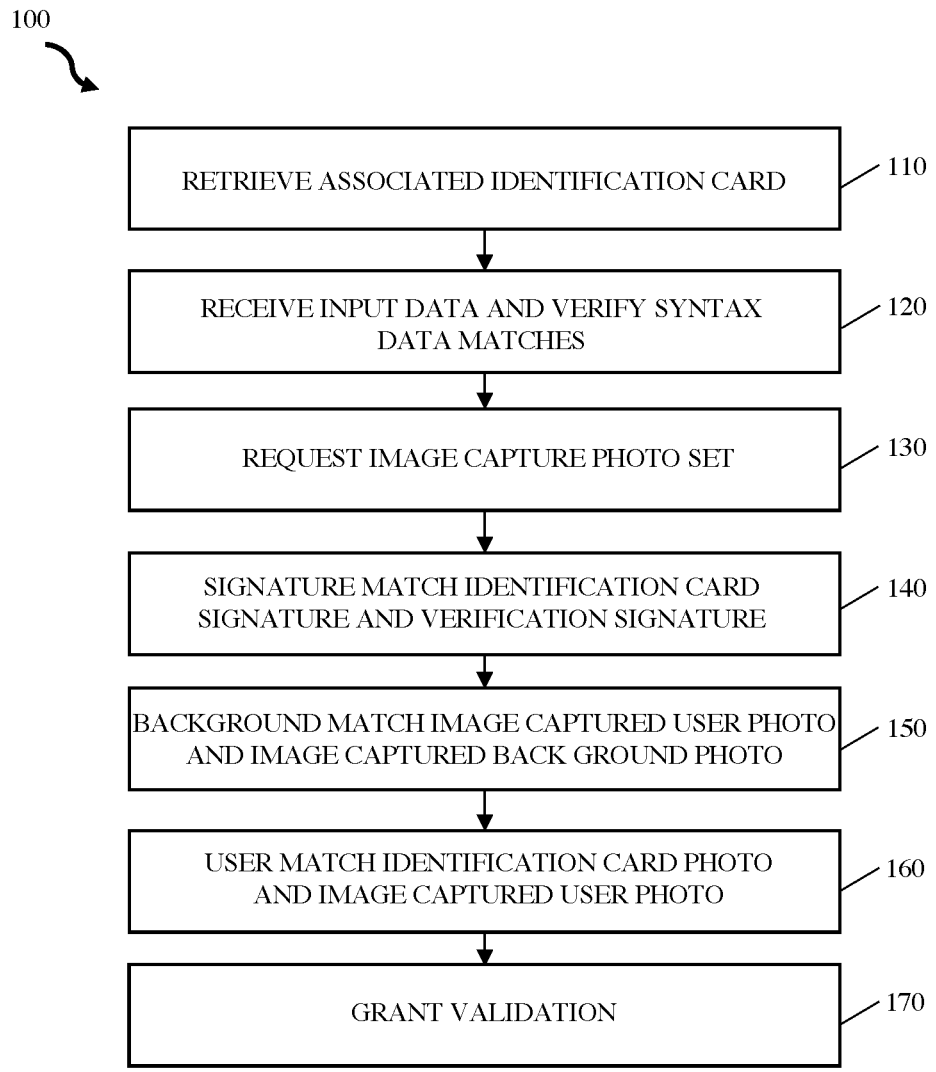
FIG. 1 illustrates a flowchart of an example method for remote user verification with applied visual analytics in accordance with some embodiments of the present disclosure.

While the invention is amenable to various modifications and alternative forms, specifics thereof have been shown by way of example in the drawings and will be described in detail. It should be understood, however, that the intention is not to limit the invention to the embodiments described. On the contrary, the intention is to cover all modifications, equivalents, and alternatives falling within the spirit and scope of the invention.

DETAILED DESCRIPTION

Aspects of the present disclosure relate to high level architecture. More particular aspects relate to enhancing the Know-Your-Customer (KYC) process by applying visual analytics in a software application to validate a user's identity. While the present disclosure is not necessarily limited to such applications, various aspects of the disclosure may be appreciated through a discussion of various examples using this context.

The software application may be executed through a network of wireless physical devices with consideration for the demands and constraints of such devices. Wireless physical devices can be, but are not limited to mobile phones, tablets, handheld devices, wearable devices and other devices having electronic, hardware, software, sensors, actuators, and/or network connectivity. Software applications can further comprise a web-based application, a native application, and/or a hybrid application.

In embodiments, the software application operates using high level architecture (HLA). HLA is a general-purpose architecture for distributed computer simulation systems. Using HLA, computer simulations can interact (e.g., communicate data, synchronize actions) with other computer simulations regardless of computing platforms. In embodiments, HLA operates on a mobile platform comprising a front-end and a back-end engine, however, the mobile platform is provided by way of example only for purposes of explanation but is not to be construed as limiting. The front end comprises the user interface of a user device (e.g., mobile phone) and includes a collection of processes and code (e.g., HTML, CSS, JavaScript) executed on the user side. The back-end comprises technology required to process information sent from the front-end and generates a response back to the user. Some components of technology used in the back-end engine include, but are not limited to a server, the software application, and a database.

Some institutions susceptible to malicious and fraudulent attacks (e.g., hacking, phishing, forgery) attempt to mitigate any fraud-related risks by implementing a Know-Your-Customer (KYC) process when a customer requests access to open an account. KYC comprises strict regulations for identifying and verifying the identity of clients and consequently, must establish and maintain written customer identification programs setting forth the standards for verifying their identity. For example, when a customer requests to open an account, all interactions must be initiated and approved at a local physical site with supplemented identification documents (e.g., identification card, pass port) to prove the customer is, whom they claim to be. The KYC approach prohibits remote access to opening an account and is only beneficial to customers within an accessible range of a local physical site. Aspects of the present disclosure address a solution to this issue.

Aspects of the present disclosure relate to visual analytics, and more specifically, signature matching local and broad characteristics of a user's real-time signature against the bearer's signature of a claimed user's identification card to validate a remote user's identity. Real-time can be defined as the time constraint upon which a user action was initiated. As used herein, signature matching means matching, against a first data implemented threshold, a first written signature of a first input (e.g., photo) with the signature of a retrieved input (e.g., license), to determine signature overlap. In embodiments, an identification card (e.g., electronic Kartu Tanda Penduduk (e-KTP)) signature can be retrieved from a database comprised in a government system (e.g., Dukcapil) and matched against a threshold to verify a user's real-time signature. In embodiments, a threshold value is established from implemented data and threshold-based matching determines account authorization.

Aspects of the present disclosure relate to visual analytics, and more specifically, background matching a set of images comprising a user and a surrounding user environment (hereinafter referred to as background). As used herein, background matching means matching, against a second data implemented threshold, a surrounding background environment of a first user photo with the surrounding background environment of a second photo, to determine background overlap. Images are captured with capabilities of the user device, initiated with the software application. Background matching can comprise various methods, including but not limited to, scale-invariant feature transform and image patch-based matching. Various methods can be enhanced using deep learning neural networks or implemented by machine learning operators comprised in the user device. In embodiments, background matching is matched against a threshold and is used to verify the location a remote user claims to be. The threshold value is established from implemented data and threshold-based matching determines account authorization.

Aspects of the present disclosure relate to visual analytics, and more specifically, user matching a user image against a threshold to the bearer's photo of a claimed user's identification card to validate a remote user's identity. As used herein, user matching means matching, against a third data implemented threshold, a user's photo in an image received from the user with a photo of the user comprised in the retrieved digital identification card (e.g., license), to determine user identity overlap. embodiments, user images are captured with capabilities of the user device, initiated with the software application. User matching can use biometric and facial recognition to determine a match score. Various methods can be enhanced using deep learning neural networks or implemented by machine learning operators comprised in the user device. In embodiments, a threshold value is established from implemented data and threshold-based matching determines account authorization.

Aspects of the present disclosure can further relate to a video messaging system using the capabilities of the user's device, initiated after account authorization rejection. Account authorization rejection can occur when, for example, signature matching, background matching, and/or user matching fail to satisfy the data implemented threshold.

Advantageously, the present disclosure enables implementation of a remote KYC process and bridges the gap between digitally active users and potential users in rural areas with little or no access to a local physical site for user identification. Remotely verifying a user's signature, face, and claimed location can eliminate the in-person manual process of for opening an account. Furthermore, aspects of the present disclosure provide electronic protections to reduce or eliminate potential sources of fraud in remote authorization that have precluded conventional systems from implementing a secure remote authorization for opening an account.

The advantages are example advantages and embodiments exist that contain all, some, or none of the advantages while remaining within the spirit and scope of the present disclosure.

Thus, aspects of the present disclosure are necessarily rooted in computer technology at least insofar as aspects of the present disclosure enable implementation of a KYC process in a software application environment which has hitherto not been available. Additionally, aspects of the present disclosure provide alternative improvements upon an already implemented KYC process. Aspects of the present disclosure exhibit a remote improved identification method, improved accuracy, and improved computational performance relative to known solutions without mitigating the current KYC process.

Referring now to the figures, FIG. 1 illustrates a flowchart of an example method 100 for remote user verification by matching visual analytics in accordance with some embodiments of the present disclosure. The method 100 can be performed by, for example, one or more processors, a mobile application or a different configuration of hardware. In embodiments, the method 100 begins with operation 110. For purposes of explanation, the method 100 will be described as performed in a mobile user device (e.g., mobile phone) by a software application, hereinafter referred as a mobile application, comprising high-level front-end and back-end processing architecture. However, the method 100 can be performed by other hardware components or combinations of hardware components. For example, in some embodiments, a mobile application can be used to acquire data from a user used in method 100 and then communicate the acquired data to a remote server for completion of analysis and verification processes of method 100 based on the data acquired by the mobile application.

In operation 110, the mobile application retrieves a digital copy of a user's identification card. In embodiments, the identification card may be government issued and managed through a government system. Identification cards can include, but are not limited to, physical resident identity cards and digital resident identity cards (e.g., e-KTP). Government systems can include any system maintained by a governmental agency for storage of information regarding identification cards of its citizens and/or residents, such as, for example, Dukcapil of the Ministry of Internal Affairs. Identification cards, such as e-KTP, can comprise public information relating to the bearer, such as, bearer's identity number (NIK), full name, place and date of birth, gender, marital status, religion, blood type, address, occupation, nationality, bearer's photo, expiration date, place and date of issue, bearer's signature, and/or the issuing officer's name and signature.

In operation 120, the mobile application can receive input data from the user interface of a user device (e.g., mobile phone). In embodiments, the user uploads (e.g., texts) input data associated with the user's identity comprising, but not limited to, a user's identity number (NIK), full name, place and date of birth, gender, marital status, religion, blood type, address, occupation, nationality, and/or place and date of issue, into the mobile application. The mobile application then verifies the user by matching the syntax data (e.g., lexical categories, functional categories, dependency grammar, etymology, language sequencing, etc.) of the input data against the retrieved digital copy of the user's identification card from operation 110. Identification information is then sent to the back-end engine for future processing. In embodiments, operation 120 comprises the first physical interaction step between the front-end of the mobile application and the user.

Syntax matching is the formal analysis of input text, accomplished by string matching and parsing algorithms, resulting in concrete syntax trees representing the syntactic structure of each word. Parsing, for example, the input data and the digital copy of the user's government issued identification card, strings, tokens, and weight identifiers can be assigned to each word. The mobile application can then evaluate the plurality of identifiers comprised against each input and verify syntax data matches.

In operation 130, the mobile application can provide a notification (e.g., an indication, a message, a prompt) indicating a request for real-time photos of the user. Using the existing capabilities of the user device, the mobile application can be granted access, for example, to a camera comprised in the user device. The notification can comprise text, graphics, sounds, and/or other notification. In embodiments, the notification includes recommended instructions for image capture. In operation 130, the mobile application requires the user to identify their location and further capture a plurality of image sets. For example, the mobile application can instruct the user to capture images repeatedly throughout a day, during different time intervals (e.g., 11:30 am, 2:00 pm, 6:00 pm). An image set comprises a set of at least two distinctly different images (e.g., a first photo, a second photo) taken within a threshold of time from each other. In embodiments, a first photo comprises the user and corresponding identified background location and a second photo comprises only the identified background location of the first photo. In embodiments, each photo of the image set can be captured in a landscape or portrait orientation by either the user (e.g., selfie) or by someone else. Each photo of the image set is processed for quality control and upon successful image capture the mobile application requires the user to assign his signature directly through the user interface. Operation 130 is described in more detail hereinafter with respect to FIG. 2.

In operation 140, the mobile application can match the bearer's signature associated with the retrieved digital copy of a user's government issued identification card from operation 110 against the plurality of assigned signatures from operation 130 to authenticate the user. Signature matching evaluates the broad characteristics (e.g., type of writing (e.g., cursive, print), speed of writing (e.g., harmonious, slow), spacing, size, proportions, position (e.g., slanted, straight), spelling, punctuation) and local characteristics (e.g., internal spacing, letter size, letter proportions, curves, loops. cross-points, pen lifts, strokes) of both user signature sources. Operation 140 is described in more detail hereinafter with respect to FIG. 3.

In operation 150, the mobile application can match the location the user claims to be during the plurality of image capture sets from operation 130 to authenticate the user. In some embodiments, the mobile application can use various background matching techniques between a corresponding first photo and corresponding second photo to determine this authentication. Various background matching techniques include, but are not limited to, scale-invariant feature transform (SIFT) and image-patch based matching. Operation 150 is described in more detail hereinafter with respect to FIG. 4.

In operation 160, the mobile application can match the bearer's photo associated with the retrieved digital copy of a user's government issued identification card from operation 110 against the plurality of first photos captured in operation 130 to authenticate a user. In some embodiments, the mobile application uses facial recognition to determine this authentication. Facial recognition is a biometric method of identifying an individual by comparing live capture or digital image data points in a stored record. Operation 160 is described in more detail hereinafter with respect to FIG. 5.

In operation 170, pending successful matching, the user profile is remotely verified. Although not explicitly described above, some embodiments including syntax verification, signature matching, background matching, and user matching, are evaluated against a threshold. Failure to satisfy a threshold can result in authorization rejection. In embodiments, authorization rejection can be described in more detail hereinafter with respect to FIG. 6.

FIG. 1 is intended to represent the example operations of an example method for remote user validation in accordance with some embodiments of the present disclosure. In some embodiments, however, individual operations can have greater or lesser complexity than shown in FIG. 1, and operations in addition to (or in substitution of) those shown in FIG. 1 can be present. Furthermore, in some embodiments, various operations illustrated in FIG. 1 can have greater, lesser, or different functionality than shown in FIG. 1. Furthermore, in some embodiments, various operations illustrated in FIG. 1 can occur in different orders, if they occur at all.

Figure 2:
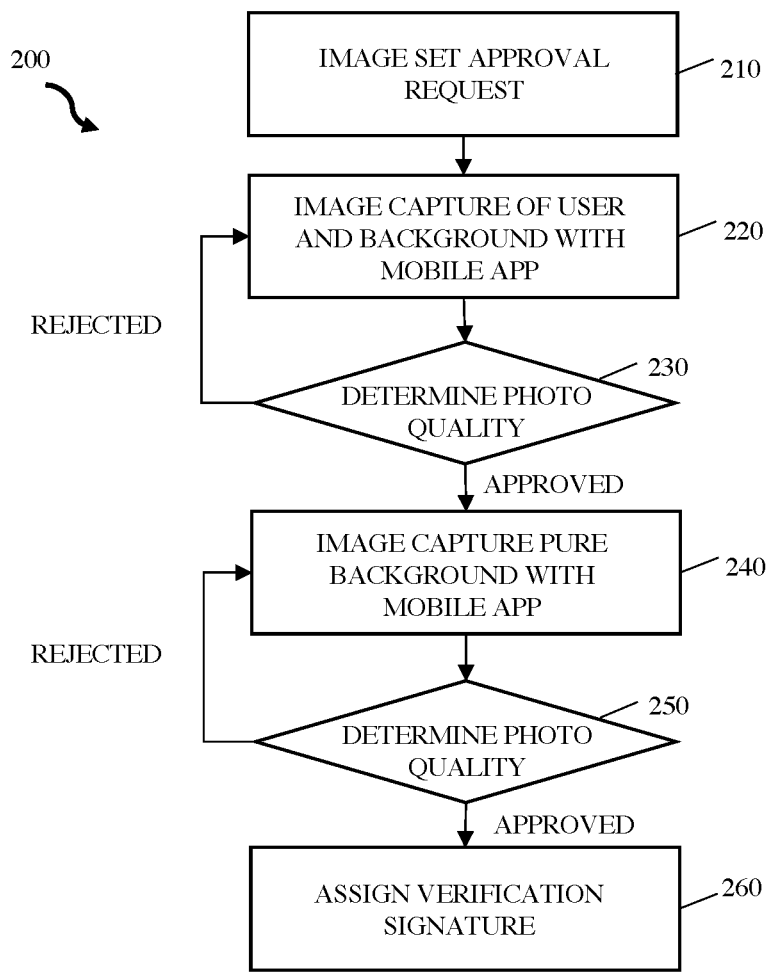
FIG. 2 illustrates a flowchart of an example method for image set quality control in accordance with some embodiments of the present disclosure.

Referring now to FIG. 2, illustrated is a flowchart of an example method 200 for image set quality control and gatekeeping in accordance with some embodiments of the present disclosure. The method 200 can be performed by, for example, one or more processors, a mobile application, or a different configuration of hardware. For clarity, similar to discussion of method 100, the method 200 will hereinafter be described as being performed by a mobile application. However, as with method 100, aspects of the method 200 can be performed by other hardware components or combinations of hardware components. Aspects of FIG. 2 comprise the front-end system between the user and the mobile application. In some embodiments, the method 200 is a sub-method of operation 130 of FIG. 1.

In operation 210, the mobile application begins requesting a real-time photo of the user and user background. A notification can comprise an indication, a message, and/or a prompt indication the request for access to a user's mobile device camera recording capabilities. A request can be verified by receiving user input or feedback such as, but not limited to, a swipe or a click via a user device interface of the mobile device. Upon verification, the camera capabilities of the user's mobile device are opened.

In operation 220, a user is sent a notification (e.g., an indication, a message, a prompt) to capture a first photo of an image set comprising the user and their current background. In some embodiments, the mobile application requires that the first photo be taken in either a portrait (e.g., vertical) or landscape (e.g., horizontal) orientation as well as in real-time comprising an un-accessorized frontal view from the midsection of the user and up. In some embodiments, the mobile application indicates to the user that a desired condition for the current background comprises an off white, non-monochromatic backdrop or a feature identifiable background. In embodiments, a feature identifiable background can include, but is not limited to, a landscape location, a building location, and a street location.

In operation 230, the first photo of the image set is processed through image quality control and watermarking. Image quality control (e.g., metric control) can be classified in terms of measuring specific types of degradation (e.g., saturation, blocking, ringing), or considering all possible signal distortions, that is, multiple image quality factors. Image quality factors can include, but are not limited to, sharpness (amount of detail), noise (variation of image density), tone (luminance vs brightness), contrast (slope of tone reproduction curve in a log-log space), color (saturation), distortion (curved lines), vignette (light falloff), lateral chromatic aberration (CLA) (color fringing), and lens flares (veiling glare). More specifically, in embodiments, operation 230 determines the quality of the first photo through overexposure and blur detection. In embodiments, overexposure is detected by determining the images luminance distribution. Relying on the images gradient, the mobile application further determines blur by measuring the amount of edges contained in the image. Edge measurements can be determined by measuring the focal blur (caused by a finite depth-of-field and finite point spread function), penumbral blur (caused by shadows created by light sources of non-zero radius) and shading. Using a machine learning approach, operation 230 can detect facial attributes to determine any accessories (e.g., glasses, hat) that visually differentiate (e.g., hide, enhance) the natural appearance of the user. The machine learning system comprised in the mobile application determines the image quality. User and background images satisfying a data implemented threshold are saved in a network database, sent to the back-end engine for further processing and issue, to the user interface, an approval notification (e.g., an indication, a message, a prompt). User and background images failing to satisfy the threshold issue, to the user interface, a retake notification (e.g., an indication, a message, a prompt) and operation 220 is repeated.

In operation 240, after receiving an approval notification from operation 230, the mobile application communicates to the user a second notification (e.g., an indication, a message, a prompt) to capture the second photo of the image set. In some embodiments, the second photo's capture time must be within a pre-determined time (e.g., two minutes) from the first photo and only include the background as captured in the first image. In some embodiments, the mobile application requires that the second photo be taken in the identical orientation (e.g., landscape, portrait) as the first photo of the image set as well as comprise the same background viewpoint with identical feature identifiers.

In operation 250, the second photo of the image set is processed through image quality control and watermarking. Image quality control (e.g., metric control) can be classified in terms of measuring specific types of degradation (e.g., saturation, blocking, ringing), or considering all possible signal distortions, that is, multiple image quality factors. Image quality factors can include, but are not limited to, sharpness (amount of detail), noise (variation of image density), tone (luminance vs brightness), contrast (slope of tone reproduction curve in a log-log space), color (saturation), distortion (curved lines), vignette (light falloff), lateral chromatic aberration (CLA) (color fringing), and lens flares (veiling glare). More specifically, in embodiments, operation 230 determines the quality of the second photo through overexposure and blur detection. In embodiment, overexposure is detected by determining the images luminance distribution. Relying on the images gradient, the mobile application further determines blur by measuring the amount of edges contained in the image. Edge measurements can be determined by measuring the focal blur (caused by a finite depth-of-field and finite point spread function), penumbral blur (caused by shadows created by light sources of non-zero radius) and shading. The machine learning system comprised in the mobile application determines the image quality. Pure background images satisfying a data implemented threshold are saved in a network database, sent to the back-end engine for further processing and the mobile application issues, to the user interface, an approval notification (e.g., an indication, a message, a prompt). User and background images failing to satisfy the threshold cause the mobile application to issue, to the user interface, a retake notification (e.g., an indication, a message, a prompt) and operation 240 is repeated.

After receiving two approval notifications, the mobile application outputs a notification to the user, in operation 260, to input his claimed location and assign his signature for image set verification. The mobile application collects and saves each signature in a database for further processing. For example, in some embodiments, inputting the users claimed location can include using a global positioning service (GPS) sensor comprised in the user device. Additionally, in some embodiments, operation 260 requires the assigned signature be transcribed onto the user device interface via a writing utensil (e.g., finger, stylus). In embodiments, broad and local characteristics (e.g., like broad and local characteristics of operation 140 of FIG. 1) of the assigned signature are monitored, saved into a database in the network, and sent to the back-end engine for further processing.

In embodiments, multiple rounds of the method 200 are repeated during the day to introduce different backgrounds and accommodate for different lighting conditions. FIG. 2 is intended to represent the example operations of an example method for image quality control in accordance with some embodiments of the present disclosure. In some embodiments, however, individual operations can have greater or lesser complexity than shown in FIG. 2, and operations in addition to (or in substitution of) those shown in FIG. 2 can be present. Furthermore, in some embodiments, various operations illustrated in FIG. 2 can have greater, lesser, or different functionality than shown in FIG. 2. Furthermore, in some embodiments, various operations illustrated in FIG. 2 can occur in different orders, if they occur at all.

Figure 3:
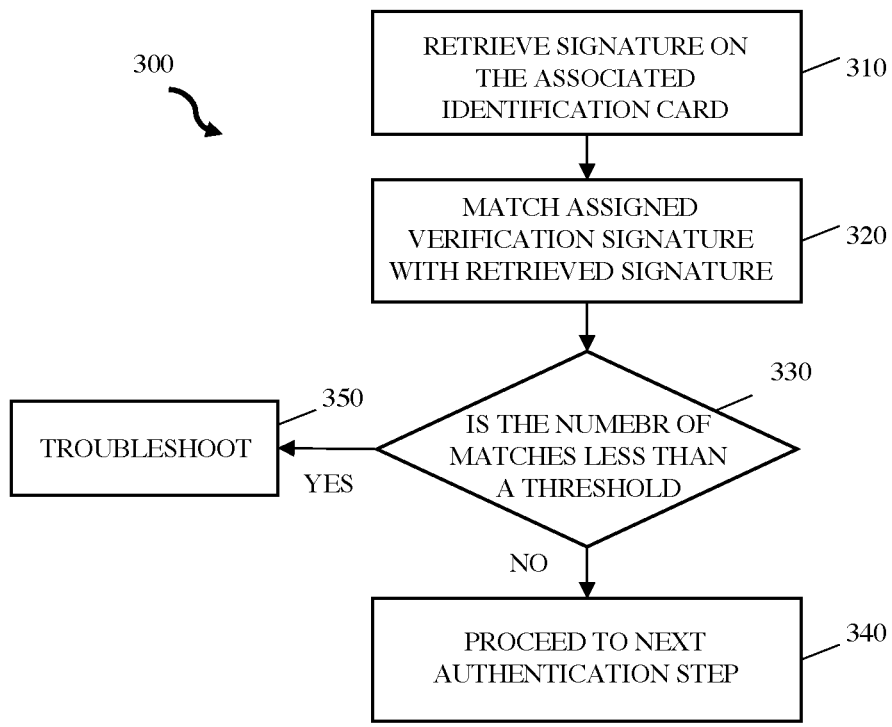
FIG. 3 illustrates a flowchart of an example method for signature matching in accordance with some embodiments of the present disclosure.

Referring now to FIG. 3, illustrated is a flowchart of an example method 300 for signature matching in accordance with some embodiments of the present disclosure. The method 300 can be performed by, for example, one or more processors, a mobile application, or a different configuration of hardware. For clarity, the method 300 will hereinafter be described as being performed by the mobile application. However, as with methods 100 and 200 discussed above, aspects of the method 300 can be performed by other hardware components or combinations of hardware components. Aspects of FIG. 3 comprise the back-end engine of the mobile application. In some embodiments, the method 300 is a sub-method of operation 140 of FIG. 1.

In operation 310, the mobile application retrieves the signature from the associated identification card in operation 110 of FIG. 1. In operation 320, the plurality of signatures assigned from method 200 are retrieved from the network database associated with front-end data and matched against each other. In some embodiments, after compiling an average assigned signature based on the plurality of signatures assigned from method 200, operation 320 matches the average assigned signature against the signature retrieved from operation 110. In further embodiments, each assigned signature can be matched to the signature retrieved from operation 110 to take an average of the results.

Monitored data from the plurality of assigned signatures is mined to create an average assigned signature. Each broad and local characteristic can be mapped and used to determine identifiable aspects and overlaps between the assigned signatures and signature of the user identification card. For example, by measuring the time variations each signature requires to write; the mobile app establishes a baseline for determining the familiarity a user has with writing their claim signature. For users claiming to be who they claim to be, the time required to write each signature will have a far less dispersion then, as if, someone trying to forge one. Additionally, an average signature can establish statistical averages so that both signatures can be quantifiably measure based on, but not limited to, spacing, size, and orientation angles. Various methods to match each assigned signature against the identification card signature can be implemented.

In some embodiments, using a neural network approach, the mobile application can extract a feature set representing each signature (e.g., length, height, duration) and learn the relationship between each class (e.g., genuine, forged). Once a feature set is established, the mobile application can use features from a signatures contour, direction, and data count to establish a match score.

In some embodiments, using a template matching approach, the mobile application can use one-dimensional position variations (e.g., letter orientations) from the identity card signature to be compared with the monitored data of the assigned signatures so to physically overlay each signature as to identity similarities.

In some embodiments, using a statistical approach, the mobile application can calculate the relation and deviation between two or more monitored data points (e.g., broad characteristics, local characteristics, letter orientation angle) to establish correlation coefficients each signature. Each signatures correlation coefficient can be weighted to determine the divergence of similarity.

In operation 330, it is determined based on implemented data of the associated identification card signature, if the number of matches between the assigned signatures and the signature on the identification card satisfies the threshold. If the threshold is satisfied, signature processing verification is complete at block 340. For example, at block 340, processing in the back-end engine continues at the subsequent processing step and a signature matching approval notification (e.g., an indication, a message, a prompt) is issued to the user interface. At block 350, assigned signatures failing to satisfy the identification card signature threshold initiate a troubleshoot notification (e.g., an indication, a message, a prompt) issued to the user interface. Authorization is then rejected and processing in the back-end engine suspends.

FIG. 3 represents example operations of an example method for signature matching in accordance with some embodiments of the present disclosure. In some embodiments, however, individual operations can have greater or lesser complexity than shown in FIG. 3, and operations in addition to (or in substitution of) those shown in FIG. 3 can be present. Furthermore, in some embodiments, various operations illustrated in FIG. 3 can have greater, lesser, or different functionality than shown in FIG. 3. Furthermore, in some embodiments, various operations illustrated in FIG. 3 can occur in different orders, if they occur at all.

Figure 4:
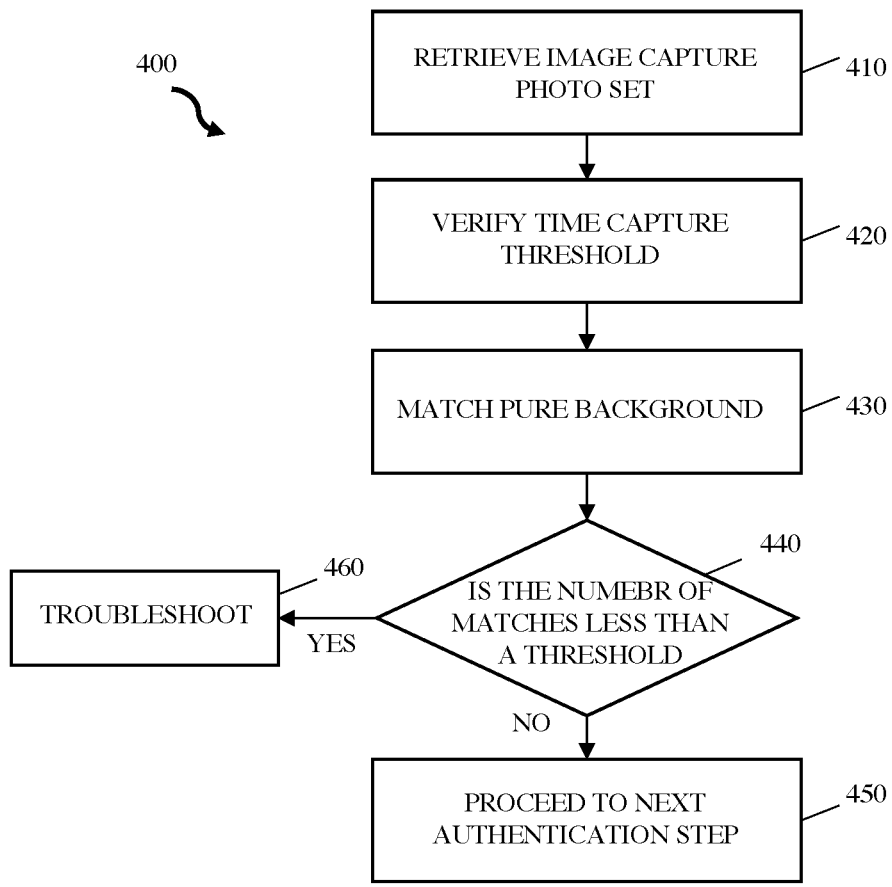
FIG. 4 illustrates a flowchart of an example method for background matching in accordance with some embodiments of the present disclosure.

Referring now to FIG. 4, illustrated is a flowchart of an example method 400 for background matching in accordance with some embodiments of the present disclosure. The method 400 can be performed by, for example, one or more processors, the mobile application, or a different configuration of hardware. For clarity, the method 400 will hereinafter be described as being performed by the mobile application, similar to methods 100-300 above. However, as with methods 100-300, aspects of the method 400 can be performed by other hardware components or combinations of hardware components. Aspects of FIG. 4 comprise the back-end engine of the mobile application. In some embodiments, the method 400 is a sub-method of operation 150 of FIG. 1.

In operation 410, the mobile application retrieves the plurality of image capture photo sets (e.g., image capture set from operation 130 of FIG. 1) from the front-end system. In operation 420, each individual image in each respective image photo set is subjected to a security screen. In an attempt to avoid imposters and high-level photo shopping, the mobile application accesses an image's exchangeable image file format (EXIF) (e.g., time it was taken, whether flash occurred, shutter speed, focal length, light value, location, aperture) and extracts the respective geocode and timestamp. The mobile application then verifies that the geocode for both images in the image set are within a predetermined coordinate range as the location claimed in operation 260 of FIG. 2. Image sets with identical and like-identical (range dependent) ranges are sent further for watermarking verification and time stamp processing. Each image captured from the user device is assigned a watermark specific to the time stamp from when the photo was taken. Each timestamp is parsed from a string into a date value and compared. Images in a respective image capture set must satisfy a predetermined threshold of time from when the first and second image were taken. For example, the user must capture the first image (e.g., photo of user and the background) within two minutes of the second image (e.g., pure background photo). Establishing time parameters, the mobile application mitigates potential fraud from forgers attempting to authorize an account from a remote location other than the one they claimed. Image sets satisfying the security screen are sent to operation 430 for further processing.

Operation 430 receives the satisfied image sets from operation 420 and matches the pure background of the second photo against the first photo. In embodiments, various background matching approaches can be applied. One embodiment can comprise scale-invariant feature transform (SIFT). SIFT extracts local feature descriptors (e.g., shapes, objects) from the background of the two photos comprised in the image sets and compares identical reference objects. A reference object is recognized in the second image by individually comparing each feature from the first image to find object matching features based on Euclidean distances of feature vectors. From the full set of matches, reference objects are filtered; objects clustered with identical location, scale, and orientation indicate successful matching. The determination of consistent clusters is performed rapidly by using an efficient hash table implementation of the generalized Hough transform. Clusters of three or more features that agree on an object are subjected to background verification. Finally, the probability that a set of feature objects indicate the presence of an object is computed against a threshold.

Alternative embodiments can comprise image patch-based matching. Using alternative methods of facial recognition, the mobile application detects the users face in the first image and then excludes the predicted image patches comprising both the users face and body. Image patches comprise the group of pixels in an image. For the remaining aspects of the image, pixel locations other than the excluded facial patch are found on the second photo and given similarity scores.

In operation 440, matched background pixel points are compared against a predefined data implemented threshold. If the number of matches between the background pixels comprised in both the first photo and the second photo satisfies the threshold, background processing verification is complete, the authorized image set continues processing and a background matching approval notification (e.g., (e.g., an indication, a message, a prompt) is issued to the user interface of the user device in operation 450. Image capture sets failing to satisfy the background match threshold cause the mobile application to issue a troubleshoot notification (e.g., an indication, a message, a prompt) to the user interface of a user interface and authorization becomes rejected in operation 460. In embodiments, processing in the back-end of the system suspends.

FIG. 4 represents example operations of an example method for background matching in accordance with some embodiments of the present disclosure. In some embodiments, however, individual operations can have greater or lesser complexity than shown in FIG. 4, and operations in addition to (or in substitution of) those shown in FIG. 4 can be present. Furthermore, in some embodiments, various operations illustrated in FIG. 4 can have greater, lesser, or different functionality than shown in FIG. 4. Furthermore, in some embodiments, various operations illustrated in FIG. 4 can occur in different orders, if they occur at all.

Figure 5:
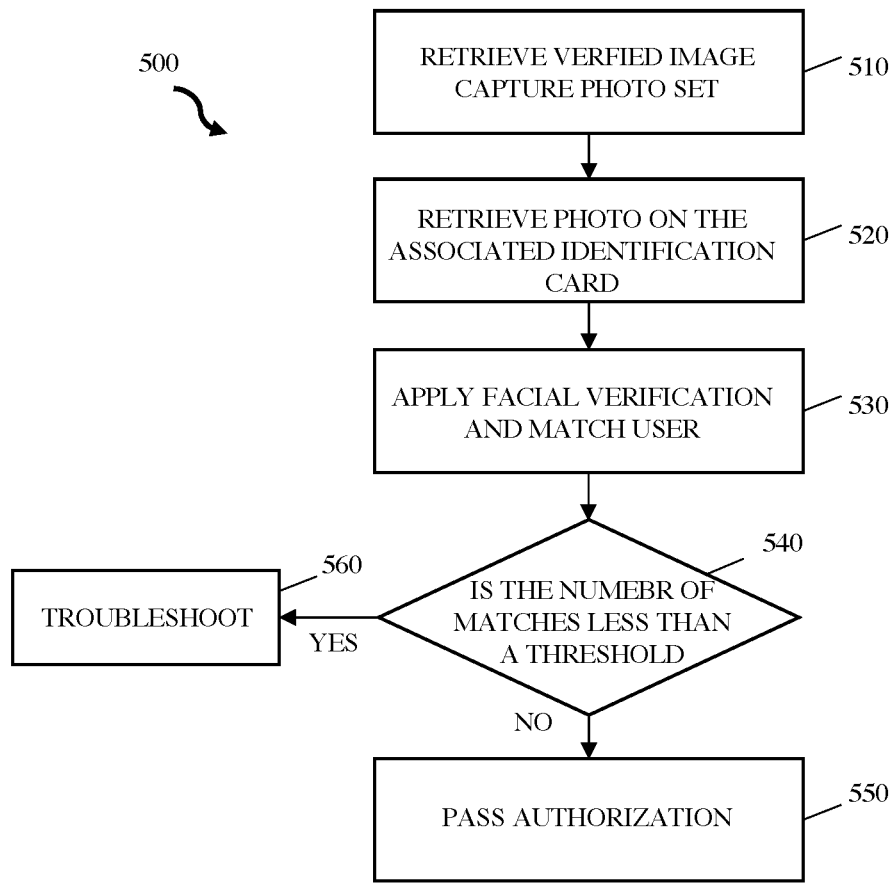
FIG. 5 illustrates a flowchart of an example method for user matching in accordance with some embodiments of the present disclosure.

Referring now to FIG. 5, illustrated is a flowchart of an example method 500 for user matching in accordance with some embodiments of the present disclosure. The method 500 can be performed by, for example, one or more processors, a mobile application, or a different configuration of hardware. For clarity, the method 500 will hereinafter be described as being performed by the mobile application. However, as discussed above with respect to methods 100-400, aspects of the method 500 can be performed by other hardware components or combinations of hardware components. Aspects of FIG. 5 comprise the back-end engine of the mobile application. In some embodiments, the method 500 is a sub-method of operation 160 of FIG. 1.

In operation 510, the mobile application retrieves the authorized image set from operation 450 of FIG. 4 and extracts the first photo comprising the user and current background. In operation 520, the mobile application retrieves the bearer's photo on the associated identification card and initiates facial recognition of the user.

Operation 530 matches the user identity of both photos retrieved in operation 510 and 520. Various methods to match each user can be implemented.

In some embodiments, deep learning neural networks can be used. Neural networks are a class of deep feed-forward artificial neural networks that has successfully been applied to analyzing visual imagery. They are made up of artificial or neuron-like structures that have learnable weights and biases. Each neuron receives some inputs and performs a dot product. In artificial learning, neurons comprise the basic computational units of neural networks. In embodiments, during the forward pass (e.g., passing an image through the network), each filter is convolved across the volume of the receptive field of an input image. A dot product is then computed between the entries of the filter and the input image producing a two-dimensional activation map of that filter. As a result, the neural network learns the filters that activate when it detects some specific type of feature at some spatial position in the input. The activation map of the input user image can be processed through additional network layers and identify matching features between both input images.

In some embodiments, scale-invariant feature transform (SIFT) can be used again. SIFT extracts local facial feature vectors (e.g., eyebrows, nose, jaw line) from the identification card's photo and compares identical reference facial feature vectors from the plurality of first photos from the image capture set in operation 510 and 520 of FIG. 5. From the full set of matches, reference facial feature vectors are filtered; vectors clustered with identical location, scale, and orientation indicate successful matching. The determination of consistent clusters is performed rapidly by using an efficient hash table implementation of the generalized Hough transform.

In some embodiments, a more traditional approach of face verification can be implemented. Using Eigen faces, which characterize the variations among faces of the same user, the first photos of the image set in operation 510 and 520 of FIG. 5 are extracted from the network database and compiled into a linear combination. Weights of the Eigen face in each photo of the plurality of image sets are used to determine if the user matches the bearers photo associated with the identification card.

In operation 540, matched user weights are compared to a predefined data implemented threshold. If the facial weights comprised in both the first photo and the identity card photo satisfy the threshold of similarity, facial recognition is complete, processing is complete, and an authorization passed notification (e.g., an indication, a message, a prompt) is issued to the user interface of the user device in operation 550. An authorization passed notification can include information regarding the details of a newly opened account for the user.

Image capture sets failing to satisfy the user match threshold cause the mobile application to issue a troubleshoot notification (e.g., an indication, a message, a prompt) to the user interface and authorization is rejected in operation 560. In embodiments, processing in the back-end of the system suspends.

FIG. 5 represents example operations of an example method for user matching in accordance with some embodiments of the present disclosure. In some embodiments, however, individual operations can have greater or lesser complexity than shown in FIG. 5, and operations in addition to (or in substitution of) those shown in FIG. 5 can be present. Furthermore, in some embodiments, various operations illustrated in FIG. 5 can have greater, lesser, or different functionality than shown in FIG. 5. Furthermore, in some embodiments, various operations illustrated in FIG. 5 can occur in different orders, if they occur at all.

Figure 6:
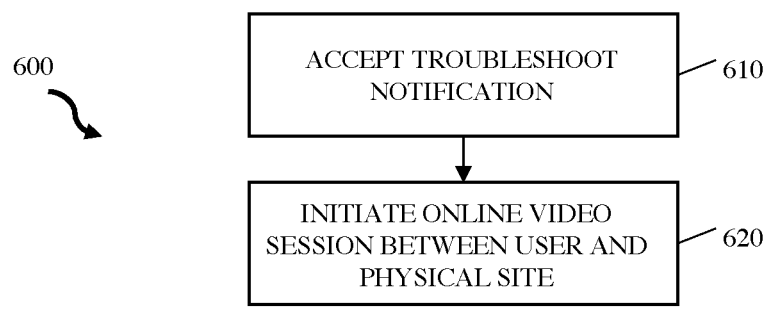
FIG. 6 illustrates a flowchart of an example method for troubleshooting in accordance with some embodiments of the present disclosure.

Referring now to FIG. 6, illustrated is a flowchart of an example method 600 for troubleshooting in accordance with some embodiments of the present disclosure. The method 600 can be performed by, for example, one or more processors, a mobile application, or a different configuration of hardware. For clarity, the method 600 will hereinafter be described as being performed by the mobile application. However, as discussed above with respect to methods 100-500, aspects of method 600 can be performed by other hardware components or combinations of hardware components. Aspects of FIG. 6 comprise the back-end engine of the mobile application. In some embodiments, the method 600 is a sub-method of operation 330 of FIG. 3, operation 440 of FIG. 4, and operation 550 of FIG. 5.

In operation 610, a user is sent a notification (e.g., an indication, a message, a prompt) to accept a troubleshoot notification. In embodiments, a troubleshoot notification can include the reason for the troubleshoot comprising, but not limited to, signature match failure, background match failure, and/or user match failure. A notification can be accepted by the user through an indication, such as, but not limited to, clicking the notification via the user device interface.

Upon accepting the notification, the mobile application accesses the cellular data capabilities comprised in the user device. In operation 620, a real-time video messaging call is initiated on the user's mobile device to start an online video session between the user and a designated representative of the institution with which the user is attempting to open an account. Through the video session, a user can create and authorize an account. The video session enables the user to create and authorize the account by, but not limited to, providing documentation to the representative, answering security questions, and alternative procedures for personal one on one communication.

FIG. 6 represents example operations of an example method for forecasting future feature signatures in accordance with some embodiments of the present disclosure. In some embodiments, however, individual operations can have greater or lesser complexity than shown in FIG. 6, and operations in addition to (or in substitution of) those shown in FIG. 6 can be present. Furthermore, in some embodiments, various operations illustrated in FIG. 6 can have greater, lesser, or different functionality than shown in FIG. 6. Furthermore, in some embodiments, various operations illustrated in FIG. 6 can occur in different orders, if they occur at all.

Figure 7:
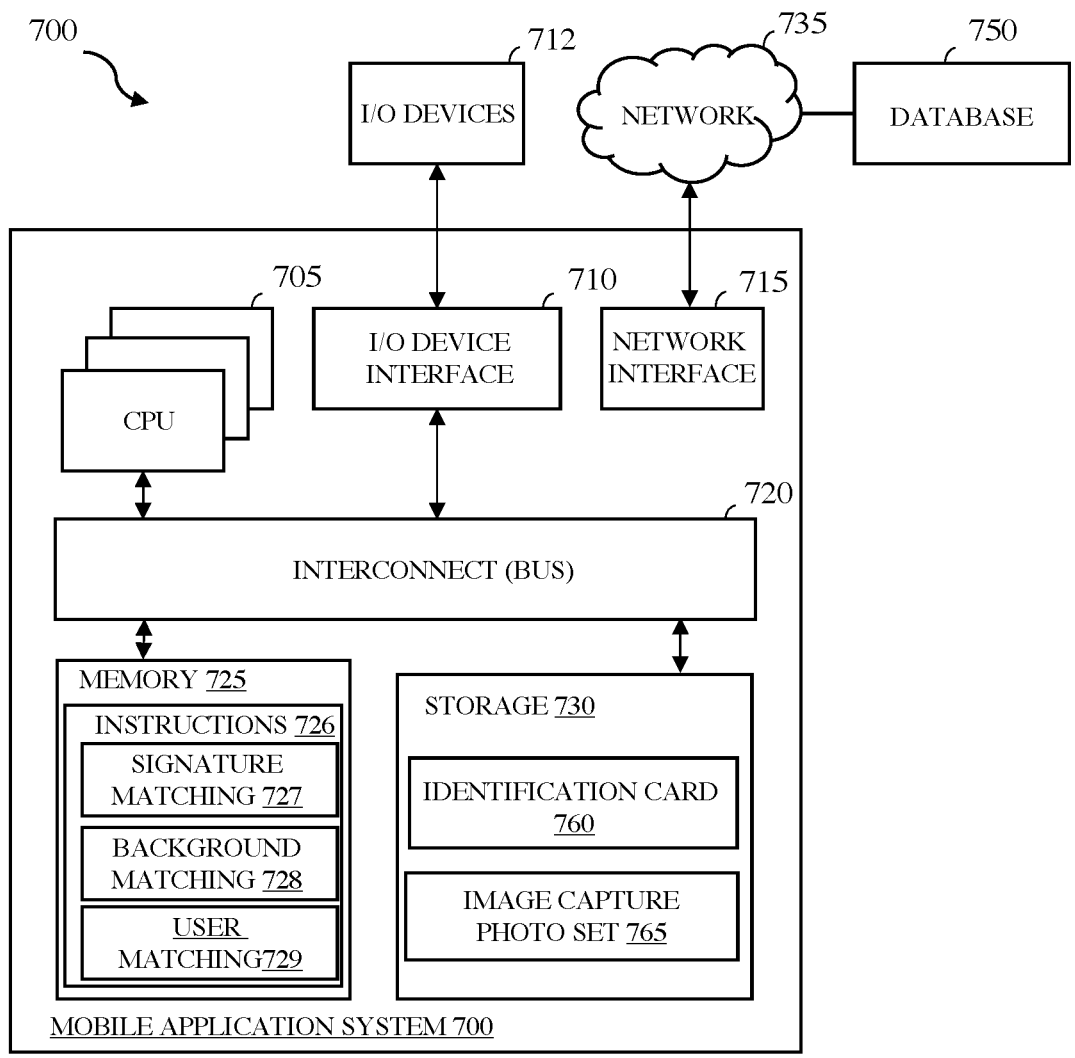
FIG. 7 illustrates a block diagram of an example mobile application system in accordance with some embodiments of the present disclosure.

FIG. 7 illustrates a block diagram of an example user device 700 in accordance with some embodiments of the present disclosure. In some embodiments, user device 700 can comprise a mobile device or computer and is configured to implement embodiments of one or more of methods 100-600 discussed above in FIGS. 1-6.

The embodiment of user device 700 depicted in FIG. 7 includes a memory 725, storage 730, an interconnect (e.g., BUS) 720, one or more CPUs 705 (also referred to as processors 705 herein), an I/O device interface 710, I/O devices 712, and a network interface 715. Memory 725 can comprise instructions 726. Instructions 726 can comprise signature matching 727, background matching 728, and user matching 729. Storage 730 can comprise identification card 760 and image capture photoset 765. User device 700 can further be coupled to a network 735. Network 735 can be coupled to external data source 750. User device 700 can additionally access camera comprised in the user device (I/O devices 712).

Each CPU 705 retrieves and executes programming instructions stored in the memory 725 or storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of the cloud or other devices connected to the user device 700 via the I/O devices interface 710 or a network 735 via the network interface 715. In embodiments, network 735 can be configured to a database storing front-end executed data.

In some embodiments, the memory 725 stores instructions 726 and the storage 730 stores front-end executed data. Front end executed data can comprise identification card 760 and image capture photo set 765. In embodiments, storage 730 can be a repository residing on highly-replicated back-end storage systems distributed geographically across a plurality of devices 712. Front-end executed data is extracted from database 450 via network 435. Instructions 726 initiates threshold matching and more specifically, signature matching 727, background matching 728, and user matching 729.

Signature matching 727 can be consistent with operation 140 of FIG. 1. Background matching 728 can be consistent with operation 150 of FIG. 1. User matching 729 can be consistent with operation 160 of FIG. 1. When executed these cause the CPU to perform a method consistent with FIGS. 1-6.

Database 750 can comprise analytics and digital information from a plurality of identity card databases.

In various embodiments, the I/O devices 712 include an interface capable of presenting information and receiving input (e.g., a user interface, such as a screen including a touch screen, pointing devices, speakers, etc.).

FIG. 7 represents example components of an example user device 700 according to embodiments of the present disclosure. In some embodiments, however, individual components can have greater or lesser complexity than shown in FIG. 7, and components other than, or in addition to those shown in FIG. 7 can be present. Furthermore, in some embodiments, various components illustrated in FIG. 7 can have greater, lesser, or different functionality than shown in FIG. 7.

Figure 8:
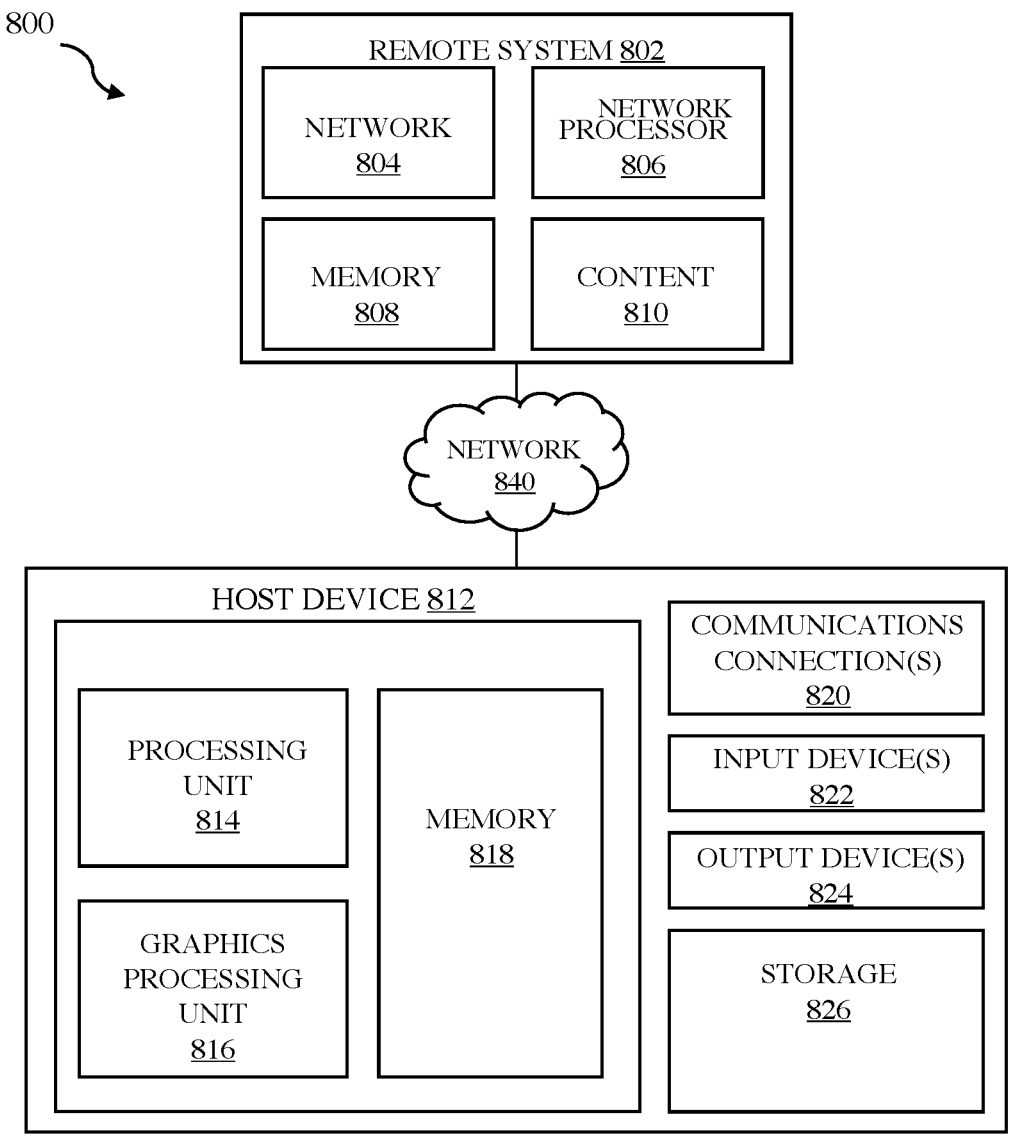
FIG. 8 illustrates a block diagram of an example computing environment in accordance with some embodiments of the present disclosure.

FIG. 8 depicts a block diagram of an example computing environment 800 in which embodiments of the present disclosure can be implemented. In some embodiments, aspects of computing environment 800 can perform the methods described in one or more of FIGS. 1-6. In embodiments, the computing environment 800 can include a remote system 802 and a host device 812.

According to embodiments, the host device 812 and the remote system 802 can be computer systems. The remote system 802 and the host device 812 can include one or more processors 806 and 814 and one or more memories 808 and 818, respectively. The remote system 802 and the host device 812 can be configured to communicate with each other through an internal or external network interface 804 and communications connection(s) 820 (e.g., modems or interface cards). The remote system 802 and/or the host device 812 can be equipped with a display or monitor. Additionally, the remote device 802 and/or the host device 812 can include optional input devices (e.g., a keyboard, mouse, scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote system 802 and/or the host device 812 can be servers, desktops, laptops, or hand-held devices.

The remote system 802 and the host device 812 can be distant from each other and can communicate over a network 840. Network 840 can be consistent with network 735 of FIG. 7. In embodiments, the host device 812 can be a central hub from which a remote system 802 and other remote devices (not pictured) can establish a communication connection, such as in a client-server networking model. In some embodiments, the host device 812 and remote system 802 can be configured in any other suitable network relationship (e.g., in a peer-to-peer configuration or using another network topology).

In embodiments, the network 840 can be implemented using any number of any suitable communications media. For example, the network 840 can be a wide area network (WAN), a local area network (LAN), the Internet, or an intranet. In certain embodiments, the remote system 802 and the host device 812 can be local to each other and communicate via any appropriate local communication medium. For example, the remote system 802 and the host device 812 can communicate using a local area network (LAN), one or more hardwire connections, a wireless link or router, or an intranet. In some embodiments, the remote system, the host device 812, and any other devices can be communicatively coupled using a combination of one or more networks and/or one or more local connections. For example, the remote system 802 can be hardwired to the host device 812 (e.g., connected with an Ethernet cable) while a second device (not pictured) can communicate with the host device using the network 840 (e.g., over the Internet).

In some embodiments, the network 840 can be implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 840.

In some embodiments, the remote system 802 can enable users to provide visual analytics to the host device 812. In some embodiments, the host device 812 can include input device(s) 824 and output device(s) 826 directly. The host device 812 can contain subcomponents, such as a computing environment 830. The computing environment 830 can include a processing unit 814, a graphics processing unit 816, and a memory 818. Memory 818 comprises instructions 320. In embodiments, instructions 820 can be consistent with instructions 726 of FIG. 7. The computing environment 830 can be configured to perform processing to ingest content 810 from remote system 802.

The storage 828 can be configured to store training information regarding weighted data as well as can be connected to memory 818. Storage 828 can be consistent with storage 730 of FIG. 7.

While FIG. 8 illustrates a computing environment 800 with a single host device 812 and a single remote system 802, suitable computing environments for implementing embodiments of this disclosure can include any number of remote devices and host devices. The various models, modules, systems, instructions, and components illustrated in FIG. 8 can exist, if at all, across a plurality of host devices and remote devices.

It is noted that FIG. 8 is intended to depict representative components of an example computing environment 800. In some embodiments, however, individual components can have greater or lesser complexity than as represented in FIG. 8, components other than or in addition to those shown in FIG. 8 can be present, and the number, type, and configuration of such components can vary.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device 7 via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for using visual analytics to validate a remote user's identity, the method comprising:

retrieving a user's photo and a user's signature from a digital associated identification card;

requesting a real-time photo set, wherein the real-time photo set includes a first photo and a second photo;

requesting a real-time written signature with the requested real-time photo set;

signature matching the real-time written signature with the first photo against the user's signature with the digital associated identification card;

background matching a background in the first photo of the real-time photo set against a background in the second photo of the real-time photo set;

user matching an image of the user from the first photo in the real-time photo set against the user's photo from the digital associated identification card; and validating the user's identity in response to determining that the real-time written signature with the first photo set matched against the user's signature with the retrieved digital associated identification card satisfies a first threshold, the background in the first photo of the real-time photo set matched against the background in the second photo of the real-time photo set satisfies a second threshold, and the image of the user from the first photo in the real-time photo set matched against the user's photo from the digital associated identification card satisfies a third threshold.

2. The method of claim 1, further comprising rejecting validation of the user's identity in response to determining at least one of: a number of signature matches is less than the first threshold, a number of background matches is less than the second threshold, or a number of user matches is less than the third threshold.

3. The method of claim 2, wherein rejecting validation of the user's identity includes initiating an online video session.

4. The method of claim 1, wherein the first photo comprises an uploaded photo of the user with the background and the second photo comprises an uploaded photo of only the background.

5. The method of claim 1, wherein background matching the background in the first photo of the real-time photo set against the background in the second photo of the real-time photo set further comprises verifying that a first timestamp and a first image watermarking date of the first photo is within a system determined threshold of a second timestamp and a second image watermarking date of the second photo.

6. The method of claim 1, further comprising:
analyzing the first photo and the second photo of the real-time photo set for compliance with image quality control requirements regarding one or more of blur, overexposure, and accessories; and
in response to determining that one or more of the first photo and the second photo of the real-time photo set does not comply with the image quality control requirements, outputting a prompt to the user indicating a retake upload is required.

7. The method of claim 1, further comprising:
retrieving syntax data from the digital associated identification card;
receiving input data comprising a plurality of user identification information; and
verifying the syntax data matches the input data, wherein the syntax data and the plurality of user identification information each comprise one or more of a user's identity number, full name, place and date of birth, gender, marital status, religion, blood type, address, occupation, and nationality.

8. A system for using visual analytics to validate a remote user's identity, the system comprising:
a user interface configured to receive input and present output; and
a processor communicatively coupled to the user interface and configured to:
extract a user's photo, and a user's signature from a received digital associated identification card;
request a real-time photo set, wherein the real-time photo set includes a first photo and a second photo;
request a real-time written signature with the requested real-time photo set;
signature match the real-time written signature with the first photo against the user's signature of the received digital associated identification card;
background match a background in the first photo of the real-time photo set against a background in the second photo of the real-time photo set;
user match an image of the user from the first photo in the real-time photo set against the user's photo from the received digital associated identification card; and
validate the user's identity in response to determining that the real-time written signature with the real-time photo set matched against the user's signature of the received digital associated identification card satisfies a first threshold, the background in the first photo of the real-time photo set matched against the background in the second photo of the real-time photo set satisfies a second threshold, and the image of the user from the first photo in the real-time photo set matched against the user's photo from the received digital associated identification card satisfies a third threshold.

9. The system of claim 8, wherein the processor is further configured to reject validation of the user's identity in response to determining at least one of: a number of signature matches is less than the first threshold, a number of background matches is less than the second threshold, or a number of user matches is less than the third threshold.

10. The system of claim 9 wherein rejecting validation of the user's identity includes initiating an online video session.

11. The system of claim 8, wherein the first photo comprises an uploaded photo of the user with the background and the second photo comprises an uploaded photo of only the background.

12. The system of claim 8, wherein to background match the background of the first photo of the real-time photo set with the background of the second photo of the real-time photo set, the processor is configured to verify that a first timestamp and a first image watermarking date of the first photo is within a system determined threshold of a second timestamp and a second image watermarking date of the second photo.

13. The system of claim 8, wherein the processor is further configured to:
analyze the first photo and the second photo of the real-time photo set for compliance with image quality control requirements regarding one or more of blur, overexposure, and accessories; and
in response to determining that one or more of the first photo and the second photo of the real-time photo set does not comply with the image quality control requirements, output a prompt to the user indicating a retake upload is required.

14. The system of claim 8, wherein the processor is further configured to:
extract syntax data from the digital associated identification card;
receive input data comprising a plurality of user identification information; and
verify the syntax data matches the input data, wherein the syntax data and the plurality of user identification information each comprise one or more of a user's identity number, full name, place and date of birth, gender, marital status, religion, blood type, address, occupation, and nationality.

15. A computer-implemented program product for using visual analytics to validate a remote user's identity in a mobile application, the computer program product comprising a computer readable storage medium having program instructions embodied therewith, the program instructions executable by a processor to cause the processor to:
  extract a user's photo, and a user's signature from a received digital associated identification card;
  request a real-time photo set, wherein the real-time photo set includes a first photo and a second photo;
  request a real-time written signature with the requested real-time photo set;
  signature match the real-time written signature with the first photo against the user's signature with the received digital associated identification card;
  background match a background in the first photo of the real-time photo set against a background in the second photo of the real-time photo set;
  user match an image of the user from the first photo in the real-time photo set against the user's photo from the received digital associated identification card; and
  validate the user's identity in response to determining that the real-time written signature with the real-time photo set matched against the user's signature with the received digital associated identification card satisfies a first threshold, the background in the first photo of the real-time photo set matched against the background in the second photo of the real-time photo set satisfies a second threshold, and the image of the user from the first photo in the real-time photo set matched against the user's photo from the received digital associated identification card satisfies a third threshold.

16. The computer program product of claim 15, wherein the program instructions are further configured to cause the processor to reject validation of the user's identity in response to determining at least one of: a number of signature matches is less than the first threshold, a number of background matches is less than the second threshold, or a number of user matches is less than the third threshold.

17. The computer program product of claim 15, wherein the first photo comprises an uploaded photo of the user with the background and the second photo comprises an uploaded photo of only the background.

18. The computer program product of claim 15, wherein to background match the background of the first photo of the real-time photo set with the background of the second photo of the real-time photo set, the program instructions are configured to cause the processor to verify that a first timestamp and a first image watermarking date of the first photo is within a system determined threshold of a second timestamp and a second image watermarking date of the second photo.

19. The computer program product of claim 15, wherein the program instructions are further configured to cause the processor to:
  analyze the first photo and the second photo of the real-time photo set for compliance with image quality control requirements regarding one or more of blur, overexposure, and accessories; and
  in response to determining that one or more of the first photo and the second photo of the real-time photo set does not comply with the image quality control requirements, output a prompt to the user indicating a retake upload is required.

20. The computer program product of claim 15, wherein the program instructions are further configured to cause the processor to:
  extract syntax data from the digital associated identification card;
  receive input data comprising a plurality of user identification information; and
  verify the syntax data matches the input data, wherein the syntax data and the plurality of user identification information each comprise one or more of a user's identity number, full name, place and date of birth, gender, marital status, religion, blood type, address, occupation, and nationality.

21. A computer-implemented method for using visual analytics to validate a remote user's identity, the method comprising:
  receiving a request to create an account for a user;
  in response to receiving the request, retrieving a digital copy of an identification card for the user, wherein the identification card includes a photo of the user and a signature of the user;
  providing a prompt to request a first real-time photo of the user with a surrounding user environment and request a first user signature;
  providing a prompt to request a second real-time photo with the surrounding user environment without the user present and request a second user signature;
  providing a prompt to request a current location of the user;
  verifying the current location of the user in response to determining that the surrounding user environment of the first real-time photo matches the surrounding user environment of the second real-time photo; and
  validating the identity of the user based, at least in part, on the verification of the current location of the user, wherein validating the identity of the user is further based on determining that the user photo of the digital copy of the identification card matches the first real-time photo of the user and on determining that the copied signature of the user from the digital copy of the identification card matches the first user signature and the second user signature.

22. The method of claim 21, further comprising:
  comparing the user photo of the digital copy of the identification card to the first real-time photo of the user;
  comparing the copied signature of the user from the digital copy of the identification card to the first user signature; and
  comparing the copied signature of the user from the digital copy of the identification card to the second user signature.

23. A system for using visual analytics to validate a remote user's identity, the system comprising:
  a user interface configured to receive input and present output; and
  a processor communicatively coupled to the user interface and configured to:
  receive, via the user interface, a request to create an account for a user;
  in response to receiving the request, retrieve a digital copy of an identification card for the user, wherein the identification card includes a photo of the user and a signature of the user;
  provide a prompt to request a first real-time photo of the user with a surrounding user environment and request a first user signature;
  provide a prompt to request a second real-time photo with the surrounding user environment without the user present and request a first user signature;
  provide a prompt to request a current location of the user;
  verify the current location of the user in response to determining that the surrounding user environment of the first real-time photo matches the surrounding user environment of the second real-time photo; and validate the identity of the user based, at least in part, on the verification of the current location of the user, wherein validation of the identity of the user is further based on a determination that the user photo of the digital copy of the identification card matches the first real-time photo of the user and on a determination that the copied signature of the user from the digital copy of the identification card matches the first user signature and the second user signature.

24. The system of claim 23, wherein the processor is further configured to:

compare the user photo of the digital copy of the identification card to the first real-time photo of the user;

compare the copied signature of the user from the digital copy of the identification card to the first user signature; and compare the copied signature of the user from the digital copy of the identification card to the second user signature.

\* \* \* \* \*